UNITED STATES PATENT OFFICE.

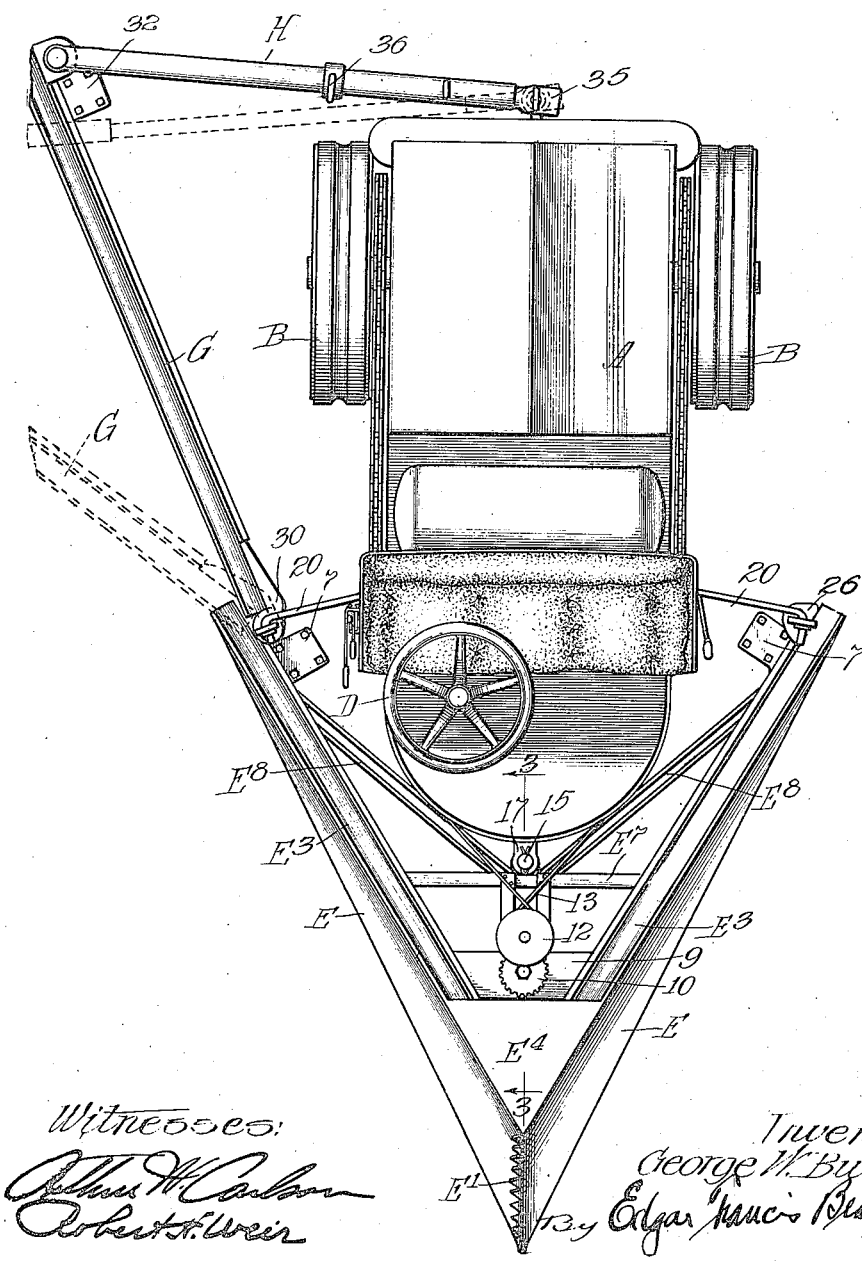

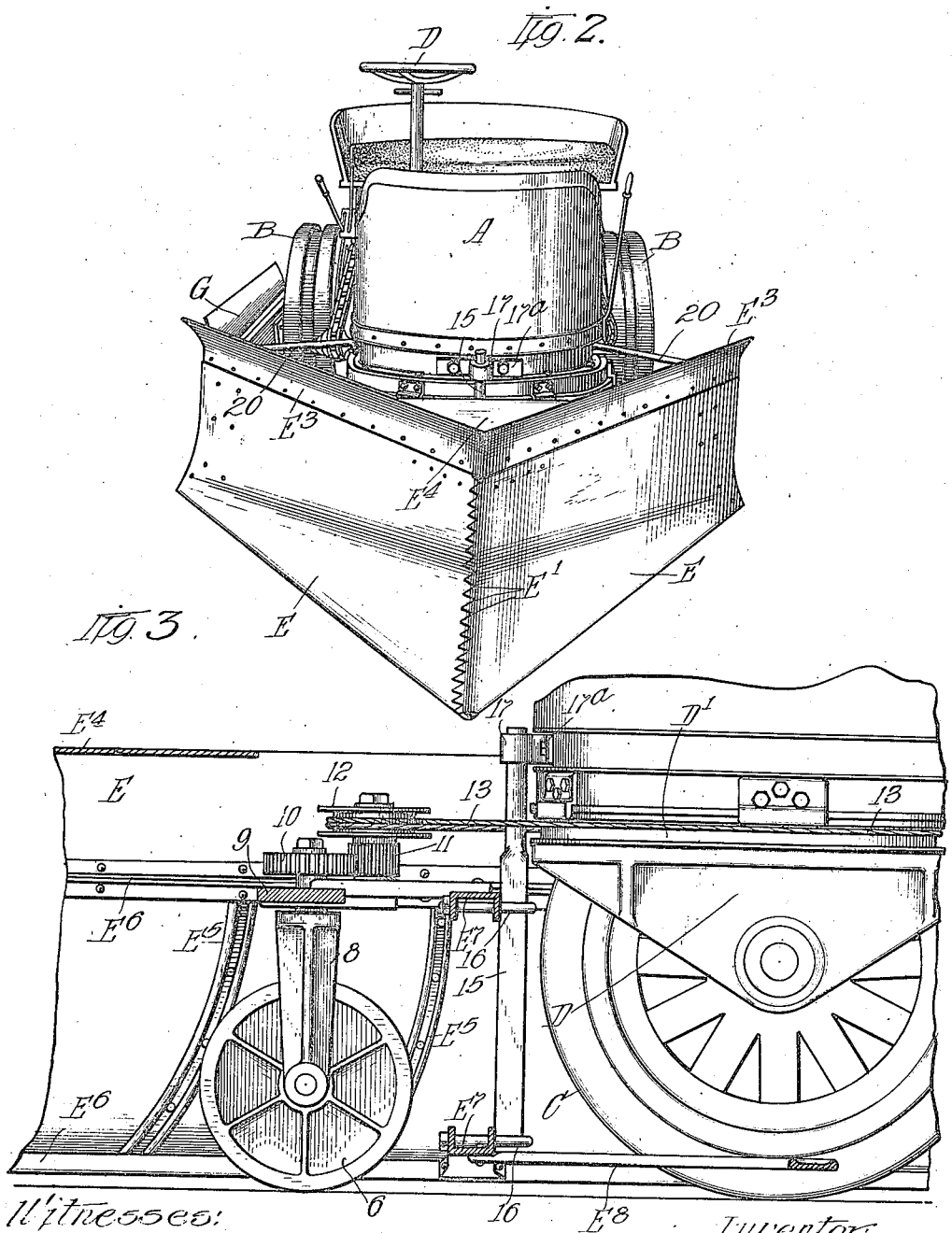

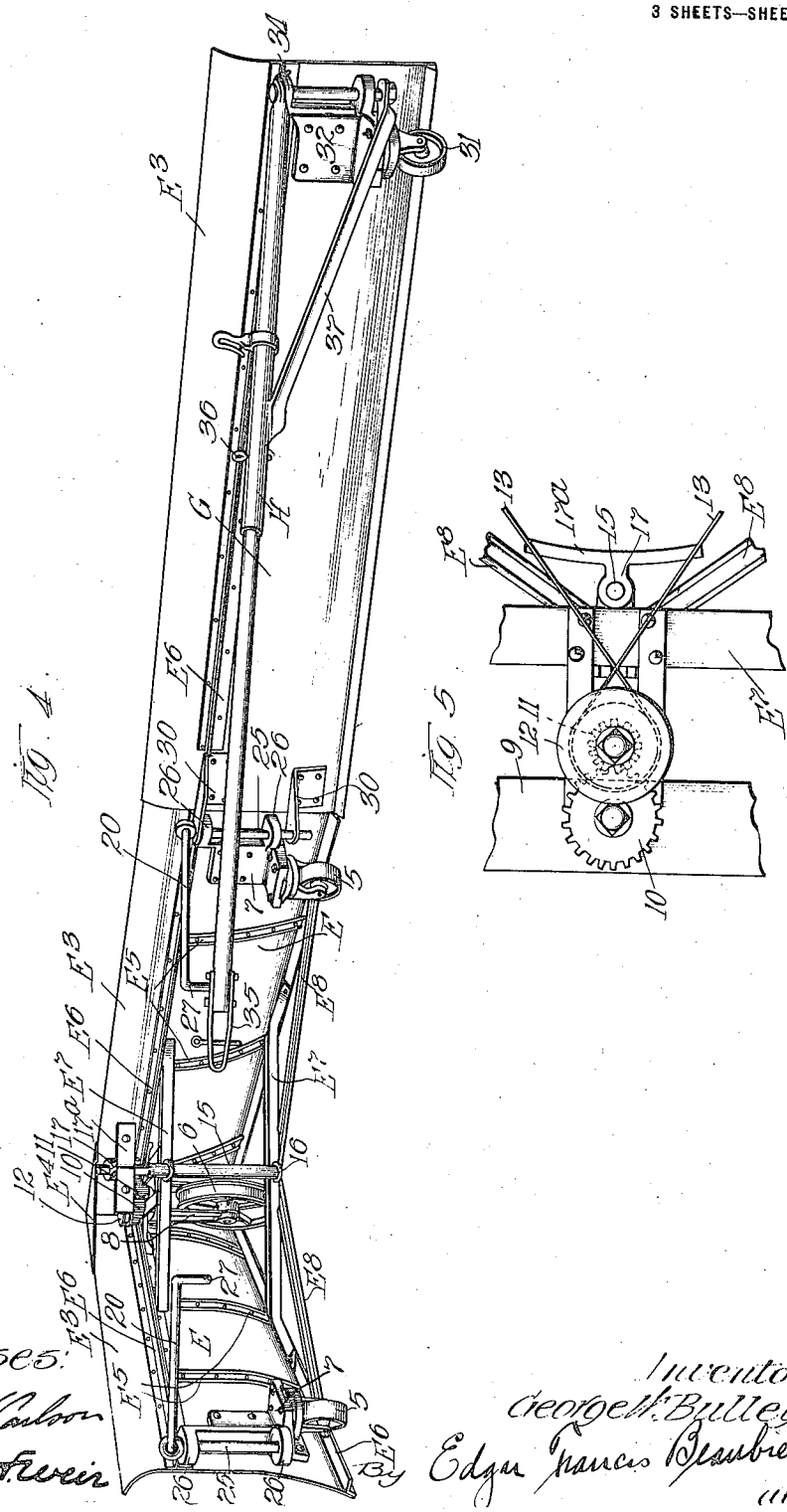

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

SNOW-PLOW.

1,254,978.  Specification of Letters Patent.  Patented Jan. 29, 1918.

Application filed March 25, 1915. Serial No. 16,895.

*To all whom it may concern:*

Be it known that I, GEORGE W. BULLEY, a citizen of the United States of America, and resident of Chicago, Cook county, Illinois, have invented a certain new and useful Improvement in Snow - Plows, of which the following as a specification.

My invention relates to improvements in plows, and has more particular reference to improvements in plows of the type which are used for removing snow and ice from the streets, thoroughfares, and the like.

One of the objects of my invention is to provide an improved plow of this character which will be simple, durable and reliable in construction and effective and efficient in operation.

A further object of my invention is to provide an improved plow which can be used in conjunction with and as an attachment for a suitable or standard propelling vehicle such as a motor truck and the like. Other objects of my invention will appear hereinafter.

My invention consists in the features of novelty which are exemplified in the construction, combination and arrangement of parts hereinafter described, and shown in the accompanying drawings, and which are more particularly set forth in the appended claims.

Referring to the drawings—

Figure 1 is a plan view of my improved snow plow attached to a suitable power vehicle and arranged to be driven thereby.

Fig. 2 is a perspective view looking at the forward end of the structure shown in Fig. 1.

Fig. 3 is an enlarged vertical longitudinal section of the plow substantially on the line 3—3 of Fig. 1, the forward end of the driving vehicle being shown in operative relation to the plow.

Fig. 4 is an enlarged interior perspective view of the snow plow and its auxiliary share looking toward the forward end of said plow.

Fig. 5 is a fragmentary detail view in plan of the steering mechanism for the plow supporting wheel.

It will be obvious to one skilled in the art, after having obtained an understanding of my invention from the disclosures herein made, that the structure shown in the drawings and which embodies my invention may be modified and re-arranged without departing from the scope and spirit of my invention, and I wish it so understood.

In the drawings, my improved plow is shown as an attachment adapted to be connected with and driven or propelled by a suitable vehicle, such as a tractor or power vehicle, and in the present construction the plow is positioned in front of the propelling vehicle so that it may be pushed through the snow. Any suitable propelling vehicle may be employed, but I prefer to use a tractor for this purpose of the type constituting the subject-matter of my co-pending application Serial Number 813,788, filed January 22, 1914, and I prefer this type of vehicle because by having a single front steering wheel beneath the frame, it can be positioned well forward within the plow and a very compact and well balanced arrangement can be obtained. This tractor has a suitable frame A supported by two tractor wheels B at its rear end and by a single supporting and steering wheel C at its forward end. This frame carries a suitable power plant by which the rear wheels B are driven to propel the tractor and which needs no particular description. The forward end of said frame is rounded off, and as before mentioned is supported by the single steering wheel C. Reference may be had to the above-mentioned co-pending application for details of this steering mechanism. It is sufficient to say here, that the steering wheel C is mounted in a suitable frame D which has a turn table D¹ of comparatively large diameter suitably mounted to rotate horizontally in a suitable bearing on the underside of the vehicle frame. The rotation of the turn table and the front wheel for steering purposes is accomplished by a steering wheel D² through suitable mechanism, not shown. This steering wheel as shown is positioned in front of the driver's seat.

The plow shown in the drawings has two shares or plow members E which are angularly disposed with respect to each other in V relation. They diverge rearwardly to points beyond the general width of the propelling vehicle so that the structure will plow a furrow in the snow of sufficient width to provide a clean path for the propelling vehicle. The plow shares are inclined upwardly and rearwardly, at their forward portion and gradually turn until at their rear ends they stand almost vertical. At their forward meeting ends E¹ the line of the joint inclines considerably rearwardly, so that an extremely sharp toe is provided for the plow. In other words, the point at the ground line is considerably in advance of the upper portion thereof and the effect of the plow is to gradually, rather than abruptly, work into the snow. Furthermore, the resistance of the snow reacts to keep the toe of the plow down. The upper edge portions E³, as shown more clearly in Fig. 2, are curved or flared outwardly and rather sharply, so as to turn the snow upon itself as the plow progresses. The forward corner of the plow shares is braced by a suitable corner plate E⁴ positioned at the top of the shares, as shown more clearly in Figs. 1 and 2, and each share is individually strengthened by a plurality of transverse ribs E⁵ and by upper and lower longitudinal ribs or members E⁶. The shares are also braced apart in their proper angular relation by intermediate upper and lower cross braces E⁷ and by lower diagonal braces E⁸ which extend from a point intermediate the length of the lower cross brace E⁷ to points on the plow shares adjacent the rear ends thereof. Thus a light, but at the same time an extremely rigid, unitary structure is produced which is capable of withstanding the strains to which it is subjected when in operation. Although it is obvious that this plow structure may be supported by the tractor or propelling vehicle itself, it is my intention to construct it rather in the form of an independent unit which can be used as an attachment to the vehicle—that is to say, I construct it in such manner that it can be readily attached to the propelling vehicle when it is desired to use the plow, and it can be as readily detached from the vehicle so that the vehicle may be used for other purposes. For these reasons, I provide the plow with an upstanding or vertical member 15 which is positioned substantially in the longitudinal center of the plow, and is detachably connected to the forward end of the vehicle frame at a point also preferably in the longitudinal center of the vehicle. The upper end of the rod or member 15 passes through a bearing 17 which is carried on a suitable plate or plug 17ª fastened to the frame of the vehicle. This member 17 and its bearing may be, if desired, left in permanent attachment to the vehicle frame and the connection or disconnection of the plow at this point will be accomplished by simply inserting the member 15 into or removing it from the bearing 17. This vertical post or member 15 in the present structure is attached to the two transverse or cross braces E⁷ by the U-bolts 16 which pass through the flanges of said cross braces and have suitable clamping nuts on their ends. These U-bolts tightly clamp the vertical post 15 into position, but they form a convenient means which permit the vertical post 15 to be connected with or disconnected from the bearing 17. By simply loosening the clamping member 16, the post may be dropped away from the bearing 17 or moved upward into connection therewith, as the case may be. In the present structure the propelling power of the vehicle is applied practically at the bearing 17, and since this point of application of power is considerably above the longitudinal axis of the plow the effect of applying power at this point is to force the nose of the plow farther downward as it is resisted by the snow. Thus the greater the resistance offered by the snow, the greater will be the tendency of the plow to hug the ground. It is further to be noted that since the propelling power is applied to the plow substantially forward of its rear ends (in this case practically at the center of the plow), any lateral forces on the portion of the plow forward of the post 15 tending to rotate or skew the plow around in a horizontal plane will be neutralized or offset by the bank of snow pressing against the opposite side of the plow rearward of the post 15. By this action, the vehicle is relieved of all lateral strains on the front wheel of the vehicle, tending to shift or skid said front wheel laterally. As a further precaution, however, against the horizontal rotation of the plow about the post 15 as a center, I provide braces 20 which are connected between the rear ends of the plow shares and the frame of the vehicle. These braces in the present construction are linked at one of their ends to vertical pins 25 which are detachably mounted in lugs or members 26 instanding from the faces of the plow shares at their rear ends. The inner ends 27 of the braces 20 are turned to form hooks which detachably connect with suitable sockets or eye members on the vehicle frame so that they may be readily connected with or disconnected from the vehicle, when desired. I prefer to mount the plow on wheels so that its entire weight will be supported by the wheels instead of by the tractor, and in the present structure I find that three wheels will properly accomplish this object. Two of these wheels are positioned at the rear ends of the plow shares and are preferably in the form of casters 5, which are swiveled on instanding brackets 7 attached to the plow shares. These casters are swiveled so that they will readily adapt themselves to the steering or turning of the plow, as will be later described. The forward portion of the plow is supported preferably by a single wheel 6 located well forward of the plow and positioned between the plow shares. This wheel has preferably a double flange on its rim so as to increase its gripping action on the ground. It is journaled in a fork 8 which depends from a cross beam 9 extending transversely from one plow share to another. This fork is journaled on a vertical axis in the cross beam 9 so that the front wheel 6 may be turned to steer the plow. In the present structure I prefer that the steering of the plow be accomplished simultaneously with and by the steering mechanism of the vehicle which is propelling the plow, and for this reason I provide a steering gear which is detachably connected with and operable by the steering mechanism. Above the cross beam 9, the fork 8 carries a gear 10 which meshes with and is driven by the suitable pinion 11 carried upon an upstanding stud shaft which is supported by the rearwardly extending portion of the cross beam 9. This pinion is fastened to and operated by a flanged rope drum 12 also mounted on said stud shaft. A continuous steering cable or rope 13 is given several turns around this drum, and also extends around the rotary turn table $D^1$ of the vehicle steering mechanism, so that the rotation of the vehicle turn table $D^1$ will also simultaneously operate the steering wheel 6 of the plow through the medium of the steering gear, just described. The cable 13 is crossed, as shown more clearly in Fig. 5, between the drum and the turn table so as to turn the plow steering wheel 6 in the proper direction corresponding to the turning of the vehicle steering wheel C. Under some conditions, it is advisable to increase the width of the furrow which is being plowed, and under other conditions it is desirable to have a greater plowing capacity on one side of the plow. This condition exists where the plow, after having plowed a furrow down the center, for instance, of a thoroughfare or roadway, is used to operate against either side of the furrow to force the snow toward the curb or gutter. Under these conditions, I prefer to provide an extension or auxiliary share on one or both sides of the plow, as desired. In the drawings I have shown one of these extension shares G, which as shown is preferably straight longitudinally, but is shaped in cross section similar to the cross section shape of the rear ends of the main plow shares. This extension when used forms a continuation of a main plow share, and in the present structure is pivotally attached to the rear end of the main plow share, so that it may be adjustable to various angles, as desired, and as indicated by the dotted and full lines in Fig. 1. The forward end of the extension on its inner side has brackets or lugs 30 which are pivotally mounted on the pins 25, previously described. In other words, when it is desired to attach the extension, the pin 25 is passed through the brackets or lugs 30, as well as the lugs 26. Being pivotally attached to the rear end of the main plow member in this manner, the forward end of the extension is thus supported by the caster wheel 5 on the main plow member. The rear end of the extension is supported by a caster 31, similar to the casters 5, this caster 31 being likewise swiveled in a suitable bracket 32. The rear end of the extension is connected by a brace, one end of which is pivoted at 34 to lugs outstanding from the bracket 32 from the rear end of the extension share G. The other end of this brace is detachably connected to a lug outstanding from the rear end of the tractor frame. It is attached in any suitable manner to this lug by means of a loop 35 having a pin which passes through it and the lug. This brace H is composed of two telescoping members, as shown clearly in Figs. 1 and 4, so that it is extensible or contractible in length to adapt it to the various positions to which the auxiliary share is swung, and in order to lock the two sections of the brace in any position to which it is extended, the sections are provided with a number of holes adapted to register so as to receive a locking pin 36. A diagonal brace 37 extends from the outer section of the brace H to the lower end of the pivot bolt in the lugs 34, so as to increase the rigidity of the brace H to prevent its vibration when fully extended, and also to brace the lower rear corner of the auxiliary share G. When the extension or auxiliary share G, or both of them, as the case may be, are not to be used in the actual plowing operation, it may be swung back to a position substantially parallel to the longitudinal axis of the tractor and close to the body of the tractor, as shown in Fig. 2. In this manner it can always be carried and available for use when necessary.

What I claim as my invention is:

1. The combination of a plow comprising shares positioned in angular relation and an independent power vehicle having its forward end positioned within said plow and arranged to propel said plow, and having a steering gear, wheels for said plow supporting the entire weight thereof independently of the vehicle, and means connecting one of said wheels with said vehicle steering gear and actuated therefrom to steer the plow.

2. The combination of a propelling vehicle having steering mechanism for itself, an independent plow connected with and adapted to be propelled by said vehicle, a steering wheel supporting said plow, and means connecting said wheel with said vehicle steering mechanism for steering the plow in unison with said vehicle.

3. The combination of a propelling vehicle having steering mechanism a plow positioned at the forward end of said vehicle and adapted to be propelled thereby a wheel within said plow supporting the forward portion thereof and operable to steer the plow, and means connecting the plow wheel with said vehicle steering mechanism for actuating said wheel.

4. The combination of a propelling vehicle having steering mechanism an independent plow positioned at the forward end of said vehicle and adapted to be propelled thereby, a wheel within the bow of said plow supporting the forward portion thereof and operable to steer the plow, means connecting the plow wheel with said vehicle steering mechanism for operating said wheel, from the vehicle steering mechanism, and caster wheels supporting the rear portion of said plow.

5. The combination of a wheel supported plow having shares meeting at their forward ends and diverging rearwardly to form a triangular-shaped structure, and a power propelled tractor having rear supporting wheels and a single forward supporting wheel and positioned with its forward end within the triangular structure, and a coupling between the plow and tractor; connected to apply propelling power at a single point between the shares and forward of the center of the triangle.

6. In a structure of the class described the combination of a plow having angularly related plow shares meeting at their forward ends and extending rearwardly, and a vehicle having steering mechanism and having its forward portion positioned between said plow shares, a steering and supporting wheel for said plow, means connecting the plow to the vehicle at a point above the axis of said wheel, and means connecting said steering wheel with the vehicle steering mechanism for corresponding actuation therewith.

7. The combination of a propelled tractor, having a steering gear and a plow attachment therefor, comprising plow shares and supporting wheels therefor, forming a self-contained plowing unit positioned in front of said tractor and connected thereto at a single point through the medium of which the plow is propelled by the tractor, and a steering gear for the plow connected with said tractor steering gear to be actuated in unison thereby.

8. The combination of a propelling vehicle having a steering gear of its own, a V-shaped plow positioned in front of the vehicle and connected to the vehicle at a single point intermediate the length and width of the plow where the preponderance of the weight of the plow is forward of said point of connection, and supporting wheels for the plow upon which the entire plow is mounted and supported, a steering gear for the plow and a flexible connection between the plow steering gear and the vehicle steering gear by which said plow steering gear is actuated from the vehicle steering gear.

9. The combination of a propelling vehicle, an independent plow structure positioned in front of the vehicle and adapted to be pushed thereby, a steering gear for the plow and a steering gear for the vehicle and interconnections therebetween for operating both steering gears from a single point at the operator's seat on the vehicle.

10. The combination of a propelling vehicle, a plow connected with and propelled by said vehicle, a steering gear for the plow, a steering gear for the vehicle, and a common means interconnecting both of said steering gears and controlling means for both gears located at the operator's position on the vehicle.

11. The combination of a self-propelled power unit, a plow structure positioned in front thereof, supporting wheels for the plow structure independent of the vehicle, steering mechanism for the vehicle, a separate steering mechanism for the plow connected with said vehicle steering mechanism, and a single controlling wheel located at the operator's position on the vehicle for simultaneously controlling both of the steering mechanisms.

12. The combination of a plow comprising angularly related shares meeting at their forward ends and diverging rearwardly, wheels supporting the rear end of said shares of said plow, a steering wheel positioned within and supporting the bow of the plow, a frame for the plow shares for holding them in proper relation, a propelling vehicle having steering mechanism operable from the operator's position on the vehicle and having its forward portion positioned within the general confines of the plow and connected to the plow frame at a point where the preponderance of weight of the plow is forward of the point of connection, and means controlled from the operator's position on the vehicle for actuating the plow steering wheel simultaneously with the steering mechanism of the vehicle.

Signed by me at Chicago, Illinois, this 8th day of March, 1915.

GEORGE W. BULLEY.

Witnesses:
 H. S. BEAUBIEN,
 E. H. CLEGG.